(12) United States Patent
Kohl et al.

(10) Patent No.: US 8,011,728 B2
(45) Date of Patent: Sep. 6, 2011

(54) VEHICLE SEAT WITH A SEAT DEPTH ADJUSTMENT DEVICE

(75) Inventors: Josef Kohl, Hirschau (DE); Christian Erker, Hahnbach (DE)

(73) Assignee: Grammer AG, Amberg (DE)

( * ) Notice: Subject to any disclaimer, the term of this patent is extended or adjusted under 35 U.S.C. 154(b) by 197 days.

(21) Appl. No.: 12/336,770

(22) Filed: Dec. 17, 2008

(65) Prior Publication Data

US 2009/0174242 A1     Jul. 9, 2009

(51) Int. Cl.
*B60N 2/44* (2006.01)
(52) U.S. Cl. .................................. 297/284.11
(58) Field of Classification Search ............... 297/284.11
See application file for complete search history.

(56) References Cited

U.S. PATENT DOCUMENTS

| | | | |
|---|---|---|---|
| 5,588,708 A | 12/1996 | Rykken et al. | |
| 6,267,445 B1* | 7/2001 | Marais | 297/423.36 |
| 6,419,317 B1* | 7/2002 | Westrich et al. | 297/284.11 |
| 6,454,353 B1* | 9/2002 | Knaus | 297/284.11 |
| 7,597,398 B2* | 10/2009 | Lindsay | 297/284.11 |
| 7,669,928 B2* | 3/2010 | Snyder | 297/284.11 |
| 2005/0184569 A1* | 8/2005 | Penley et al. | 297/284.11 |

FOREIGN PATENT DOCUMENTS

| | | |
|---|---|---|
| DE | 4104409 | 10/1991 |
| DE | 4104440 | 10/1991 |
| DE | 4104697 | 8/1992 |
| DE | 4114735 | 11/1992 |
| DE | 19645772 | 5/1998 |
| DE | 19740045 | 3/1999 |
| DE | 19801893 | 7/1999 |
| DE | 19942351 | 3/2001 |
| DE | 10112918 | 10/2002 |
| DE | 202004001823 | 6/2005 |

* cited by examiner

*Primary Examiner* — Peter R. Brown
(74) *Attorney, Agent, or Firm* — Black Lowe & Graham, PLLC

(57) ABSTRACT

The invention relates to a vehicle seat having a backrest and a seat surface device that forms a seat surface and that is provided with a pad cover, in particular an outer pad cover, wherein the seat depth of the seat surface is adjustable. A seat depth adjustment device facilitates seat depth adjustment, the seat depth adjustment device including a first deflection device for deflecting the seat pad cover in the end region of the seat surface remote from the backrest, a flexible part that is coupled to the pad cover, and at least one second deflection device for deflecting the flexible part, the second deflection device being arranged at a distance from the first deflection device.

16 Claims, 6 Drawing Sheets

VEHICLE SEAT WITH A SEAT DEPTH ADJUSTMENT DEVICE

PRIORITY CLAIM

This application claims priority to German Patent Application No. 10 2007 061 329.8, filed Dec. 19, 2007, the contents of which are incorporated herein.

FIELD OF THE INVENTION

The invention relates to a vehicle seat with a seat depth adjustment device.

BACKGROUND OF THE INVENTION

Vehicle seats with a seat depth adjustment device are already known in various embodiments. At least in most configurations of this type, the region of the seat surface located in the direction of travel, which extends forwards in particular transversely to the backrest which is usually present, is varied with regard to its size in order thus to allow an adaptation to different drivers' requirements or to different anatomies of the drivers. Of course, the need for such adjustment may be characterized not only by the anatomy of the driver but also by further factors, such as for example the sense of comfort of the driver or the like.

DE 101 12 918 A1 discloses that in the case of vehicle seats with seat depth adjustment, there is no problem in terms of an annoying gap in the region of the seat surface. In order to counteract such a gap formation, DE 101 12 918 A1 proposes that the vehicle seat has a seat depth adjustment part which is covered with a pad material, wherein this pad material is guided in the adjustment direction by an adjustment part with twice the adjustment compared to the adjustment travel of the seat depth adjustment part, and wherein this guidance takes place by means of a guide device which consists of an entrained rack-and-pinion guide.

DE 41 04 697 C2 discloses a vehicle seat with adjustable seat depth, in which an intermediate element is provided for bridging over the gap or the intermediate space between a rear and a front section of the seat pad, which intermediate element comprises two identical pairs of intersecting arms of equal length which intersect half-way along their length and are pivotably mounted there on an axle running in the transverse direction of the seat.

DE 41 14 735 A1 discloses a vehicle seat with adjustable seat depth, in which the upholstery material which covers a shell on the outside can be deflected by means of a winding shaft guided in a spring-loaded manner along rails in order to extend and shorten the seat. The shaft is arranged here in the region of the front end of the seat surface and below the latter.

DE-PS-1099866 discloses a vehicle seat in which a leg support is continuously adjustable in the longitudinal direction.

DE 199 423 51 B4 discloses a vehicle seat with a seat depth adjustment device, in which a base support provided with a triangular cross section is mounted at one corner, wherein a drive unit with a longitudinally displaceable push rod for seat depth adjustment acts in the region of a further corner of the base support, eccentrically with respect to the bearing of the base support. Here, the seat surface is covered by upholstery covering which is pulled around the front adjustment section and is extended by a rubber band.

DE 41 04 440 C2 discloses a vehicle seat with seat depth adjustment, in which the seat pad has a front part and a rear part, wherein the front part and the rear part of the pad form a coherent, continuous seat pad surface at any seat depth setting of the seat pad.

Further examples of known vehicle seats with seat depth adjustment are known from DE 41 04 409 C2 or DE 196 45 772 A1 or DE 198 01 893 C2 or DE 197 40 045 A1.

Accordingly, the present invention is directed to providing a vehicle seat with adjustable seat depth in which the seat depth adjustment can be carried out in an operationally reliable and simple manner.

SUMMARY OF THE INVENTION

There is therefore proposed a vehicle seat which comprises a backrest and a seat surface device which forms a seat surface and which is provided with an outer pad cover. The vehicle seat or the seat surface device is designed here in such a way that the seat depth is adjustable. To this end, a seat depth adjustment device is provided which comprises a first deflection device for deflecting the seat pad cover in the end region of the seat surface remote from the backrest. The seat depth adjustment device comprises at least one flexible part which is coupled to the pad cover. This flexible part may be for example a strap or a belt or a flexible part extending in a flat manner. By way of example, the flexible part may also be a pad-free or a pad-equipped extension of the pad cover. However, it is particularly preferred if the flexible part is free of any pad. The seat depth adjustment device also comprises at least one second deflection device for deflecting the flexible part, said second deflection device being arranged at a distance from the first deflection device.

The outer pad cover may extend in a flat manner for example. The term "pad cover" is to be understood in particular to mean that the cover is padded. However, it may also be provided as an alternative that the pad cover is a cover for the pad or a pad of the seat. The pad cover may in this sense be upholstery covering for example.

However—as mentioned above—it is preferred if the pad cover is for its part padded. The pad cover preferably covers the entire seat surface in a continuous manner, namely in particular in a continuous manner in the longitudinal direction of the seat surface. In particular, it is provided that the pad cover in the end region of the seat or seat surface remote from the backrest is pulled downwards, as seen from the seat surface, around the front edge of the seat surface or the front end of the seat. This is in particular such that the pad cover bears against the first deflection device.

The first deflection device is preferably of curved or bent design. As an alternative, the first deflection device may comprise at least one roller element, one cylinder element or one roller bearing element, in order to provide a low-friction deflection of the pad cover. The first deflection device may be formed for example by a section of a plate. The first deflection device is in particular designed in such a way that it is adjustable in terms of its position. The second deflection device is preferably also designed in such a way that it is adjustable in terms of its position. In one particularly preferred embodiment, it is provided that the movement of the first deflection device is coupled to the movement of the second deflection device, namely in particular in terms of a movement which runs essentially in the direction of the seat longitudinal direction running transversely to the backrest, or which is inclined relative thereto. The movement direction of the first and/or second deflection device may be linear; however, it may also be directed in a differing path which runs essentially in the direction of the seat surface oriented transversely to the backrest.

The movement direction of a first and of a second deflection device is in particular such that the seat length is extended by the movement in one orientation and the seat length is shortened by the movement in the opposite orientation. This is in particular such that the seat surface is extended by a forward movement, i.e. in the direction of the seat surface longitudinal direction on the seat surface side remote from the backrest, which takes place in particular due to the fact that a section of the pad cover, which is deflected downwards and optionally rearwards by the first deflection device, is adjusted in such a way that it forms an extension aimed in the forward direction, i.e. in the direction remote from the backrest, or a section of the seat surface located there.

In one advantageous embodiment, the first deflection device and/or the second deflection device is designed in such a way that the pad cover or the flexible part is deflected through an angle of more than 100°, preferably more than 120°, preferably more than 150°, preferably more than 160°, preferably more than 170°, preferably more than 180°, preferably more than 190°. It may be the case that the angle through which the pad cover is deflected by the first deflection device is different from the angle through which the flexible part is deflected at the second deflection device. It may be provided here that the angle through which the pad cover is deflected at the first deflection device is different depending on the position of the seat surface adjustment device.

In one particularly preferred embodiment, the pad cover is deflected by the first deflection device through an angle of between 150° and 200°, and the flexible part is deflected at the second deflection device through an angle of between 150° and 200°.

The flexible part may be for example a strap or an extension of the pad cover made from fabric or another material suitable for the flexible design, which extends in particular in a flat or linear manner. The flexible part may be made for example from plastic or metal or from another suitable material. It may for example also be provided that the flexible part is a belt. With particular preference, it is provided that the seat depth adjustment device is of essentially symmetrical design in the transverse direction of the seat surface. It may be provided for example that two second deflection devices or deflection parts are provided, which are in each case intended for a respective flexible part. The two flexible parts may be integrally formed in each case on the pad cover, namely in particular at a distance from one another in the transverse direction.

In one advantageous embodiment, it is provided that the first deflection device is formed by a curved or bent plate. This may in particular be such that the curved or bent plate is bent downwards from above. The second deflection device may be for example a bolt or a roller or a cylinder. The second deflection device may be such that it comprises a rotatable part. However, it may also be provided that the second deflection device is of fixed design, i.e. in particular is not rotatable.

With particular preference, it is provided that the first deflection device is connected in one piece with the second deflection device(s). With particular preference, the first deflection device forms an essentially rigid unit with the second deflection device. It may be provided that a plate is provided, on which the first deflection device is formed by bending and on which one or more, in particular two, second deflection devices are formed. These second deflection devices may for example be bolts which are arranged at a distance from one another in the transverse direction. It may be provided that the first and the second deflection device are furthermore coupled to an operating part. Such an operating part may also be designed for example in the manner of the plate.

The plate on which the first and/or second deflection device is arranged has already been discussed above. It may be provided that a second plate which forms the operating part is coupled to such a plate, wherein this second plate is arranged below the first plate.

In one preferred embodiment, it is provided that a shaft is formed, into which the pad cover can penetrate or penetrates. This is in particular such that the pad cover is deflected downwards from the seat surface via the second deflection device and penetrates with its end located there into said shaft.

In one advantageous embodiment, the flexible part is formed on the end deflected downwards via the first deflection device or on the end of the pad cover facing towards the shaft.

It is also particularly preferred if the pad cover has a varying thickness. For example, it may be provided that the pad cover is thinner in the end region deflected downwards via the first deflection device or in the end region facing towards the shaft than in other regions, namely in particular than in the regions facing towards the backrest.

As an alternative to configuring the pad cover with a varying thickness, the pad cover may be configured in such a way that a compression of the pad end takes place when the deflected end region is pulled into the shaft. In the case of a relatively large seat depth adjustment travel, this advantageously makes it possible to accommodate the end region of the pad cover and, when the seat is pulled in, also allows at the same time the necessary thickness of the pad cover in the front region of the seat.

It is provided in particular that the pad cover forms a continuous, coherent and thus uninterrupted surface for sitting. The pad cover thus forms in particular the outer part, i.e. the part forming the surface, of the seat surface device or seat surface. In one advantageous embodiment, the flexible part is designed in a non-elastic or substantially non-elastic manner.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
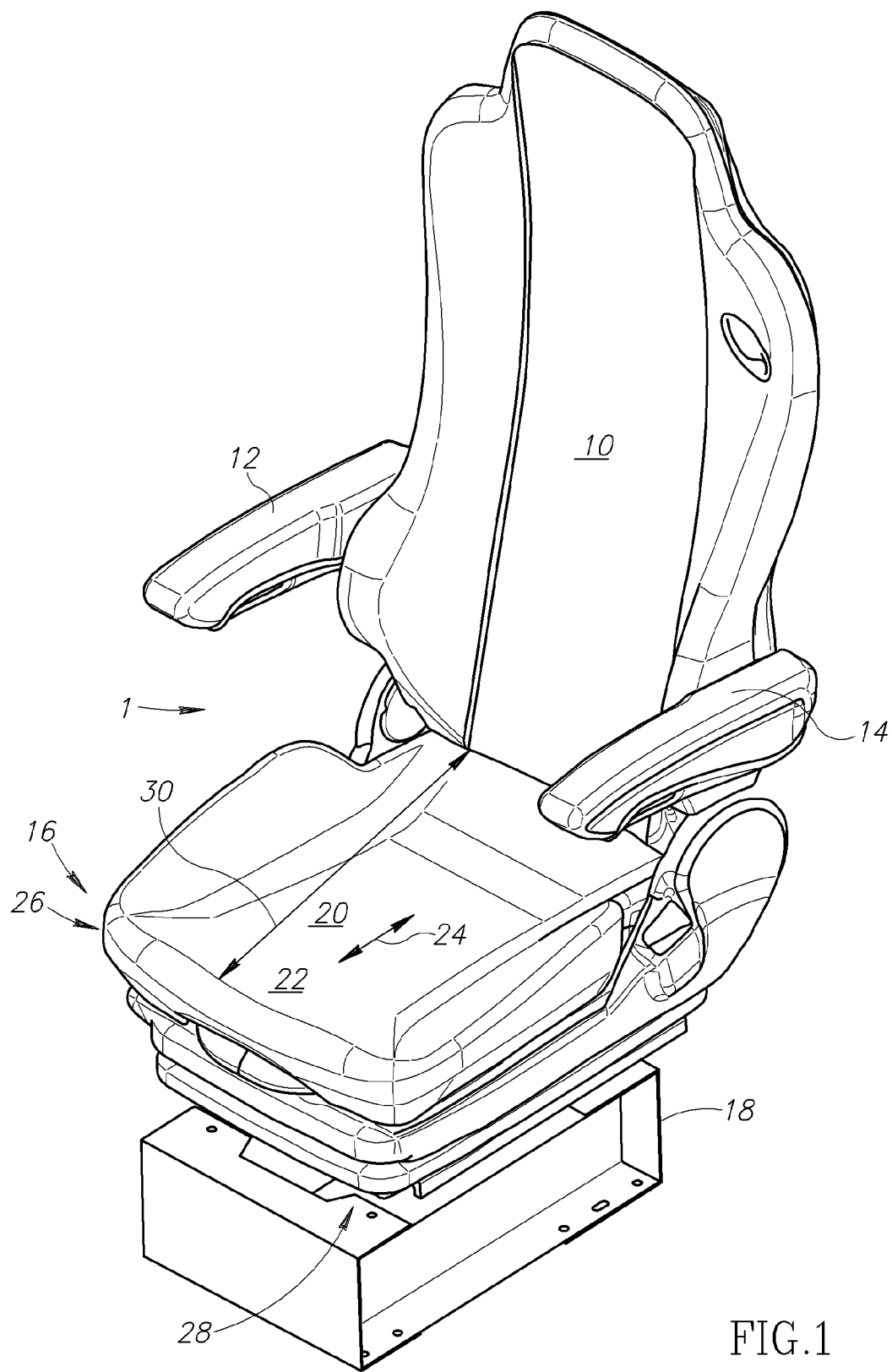
FIGS. 1-2 show an example of a vehicle seat according to the invention in two different positions of the seat length adjustment device.
Figure 2:
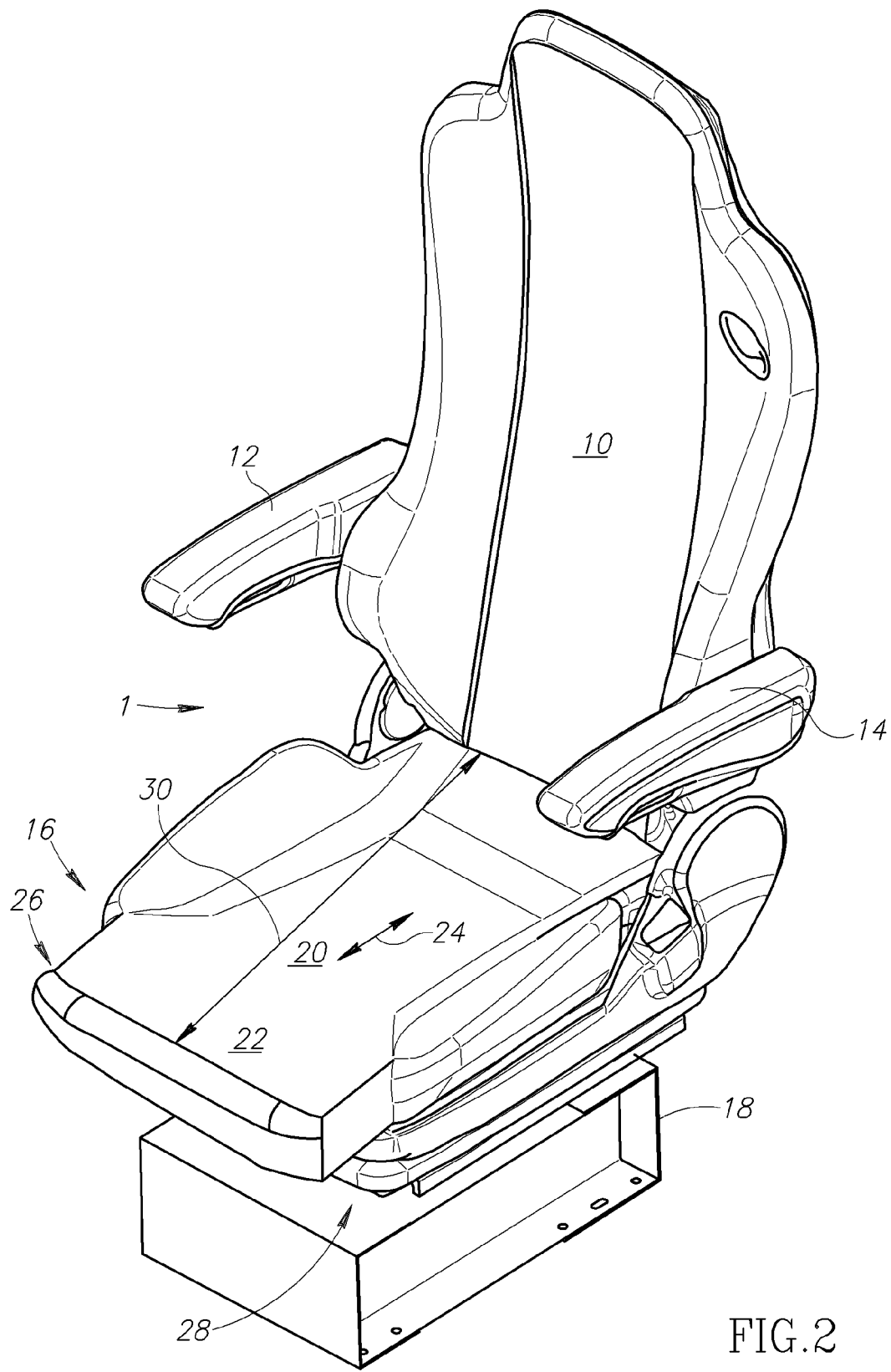

FIGS. 1 and 2 show an example of a vehicle seat 1 according to the invention, which comprises a backrest 10 and is additionally provided here by way of example with two armrests 12, 14 which are spaced apart in the transverse direction of the vehicle seat and which are arranged at the sides. Furthermore, the vehicle seat 1 comprises a seat surface device 16, and also a base 18, via which the seat is supported on the floor of the vehicle. The vehicle for which the vehicle seat is intended may be for example a utility vehicle or a heavy goods vehicle or also any other type of vehicle, such as for example a tractor, a construction vehicle, a forklift truck, a bus or the like. By way of example, the vehicle may also be a bus. Accordingly, the vehicle seat may be a bus seat or a utility vehicle seat or a heavy goods vehicle seat or the like.

The seat surface device forms a seat surface 20, on which the person sitting on the seat sits. For the sake of simplification, this person will be referred to hereinafter as the driver. In one advantageous embodiment, the vehicle seat is a driver's seat, although it should be noted that it may also be for example a passenger seat.

The seat surface comprises or is formed by a pad cover 22 which forms an outer pad which forms the surface or the seat surface and is optionally covered with a fabric upholstery covering or with a leather upholstery covering or the like. However, the pad cover 22 may also be configured differently, such as for example as an upholstery covering or the like. The pad cover 22 extends in an essentially continuous manner, i.e. in an uninterrupted manner, in the longitudinal direction 24 of the seat surface transverse to the backrest 10. The vehicle seat furthermore comprises a seat depth adjustment device 28 which is largely hidden in FIGS. 1 and 2. By means of this seat depth adjustment device 28, the seat depth 30 can be adjusted. As can clearly be seen from a comparison of FIGS. 1 and 2, the seat depth 30 in FIG. 1 is smaller than in FIG. 2.

The seat depth adjustment device comprises a first deflection device 32 which is hidden in FIGS. 1 and 2 and which is arranged in the end region 26 remote from the backrest or in the front end region 26 of the seat surface 20. At this first deflection device 32, the pad cover is deflected downwards and then optionally rearwards.

Figure 3:
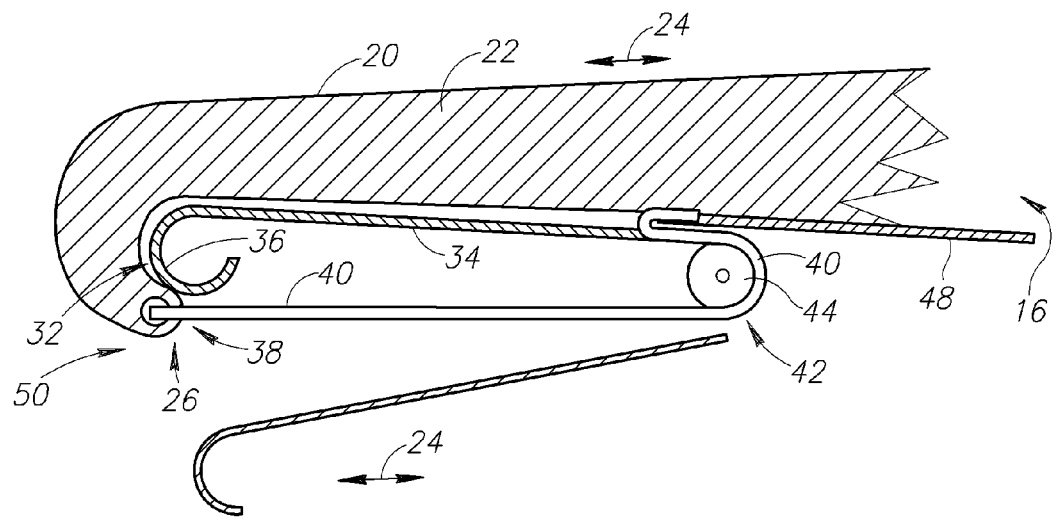
FIGS. 3-5 show an example of a vehicle seat according to the invention, in particular that shown in FIGS. 1 and 2, in three different positions of the seat depth adjustment device.
Figure 4:
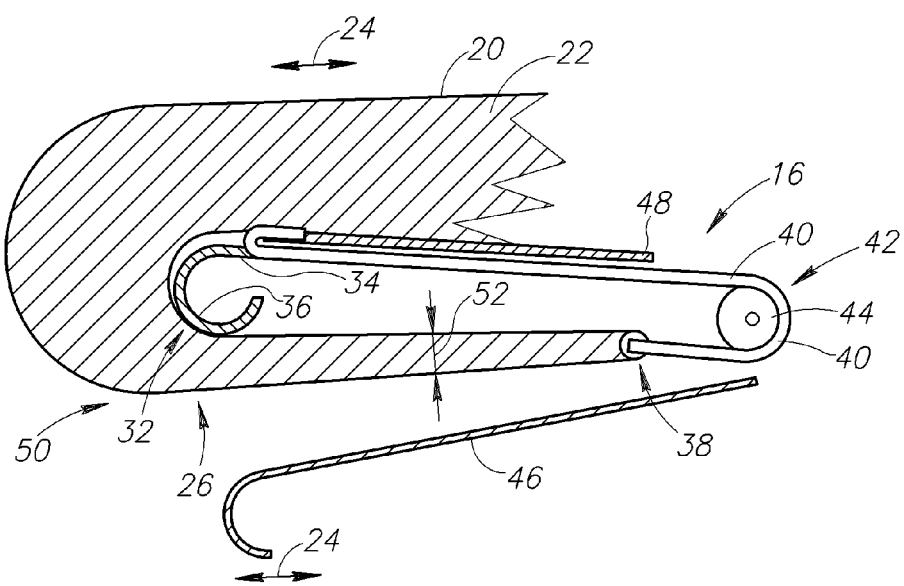
Figure 5:
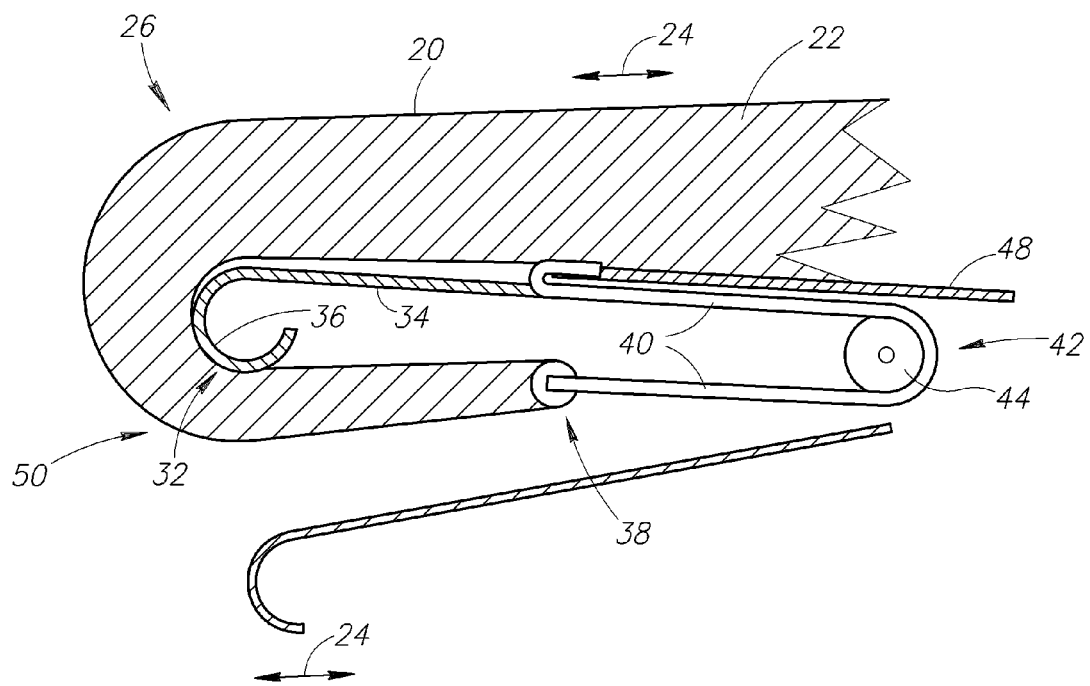

The first deflection device 32, which here deflects the pad cover 22 through an angle of more than 100°, can clearly be seen in FIGS. 3 to 5. There, the first deflection device 32 is designed as a curved or bent section or end section of a plate 34, wherein the plate 34 with the curved section forms part of the seat depth adjustment device 28. As an alternative, the end section of the plate may also be formed as an injection-molded part made from metal or for example plastic.

It can moreover be clearly seen from FIGS. 3 to 5 that a flexible part 40 is formed on or provided in the extension of the end 38 of the pad cover 22 located at a distance from the backrest 10. This is such that—as can be seen from the side view shown in FIGS. 3 to 5—two or even more flexible parts 40 may be formed on the pad cover 22 spaced apart in the transverse direction of the seat. This may for example be such that said flexible parts 40 are formed in the outer end regions of the pad cover 22 as seen in the transverse direction.

The seat depth adjustment device 28 furthermore comprises a second deflection device 42 for the deflection of the flexible part 40. The flexible part 40 is designed here as a strap or else, as already mentioned, a plurality of, in particular two, flexible parts 40 are provided which are in each case designed as a strap.

For each of these flexible parts 40, a second deflection device 42 or a second deflection part is provided here. The second deflection part or second deflection device 42 is respectively designed here as a bolt 44. Here, two separate bolts 44, i.e. one bolt 44 in each case, are provided for these two flexible parts 40. As an alternative, instead of two separate bolts, it is also possible to use a one-piece element which is designed in the manner of a bolt or has the shape of a roller or the like.

The bolts 44 are connected in one piece with or fixedly to the plate 34. Also connected to the plate 34 and the bolt 44 is an operating part 46 which is likewise designed for example as a plate. The operating part 46, which serves primarily as a compression surface for the pad cover, can be moved forward and backward essentially in the longitudinal direction 24 and thus moves the deflection devices 36, 42 with it. In other words, the deflection devices 36, 42 are coupled in movement terms to the operating part 46. The flexible part 40 or the flexible parts 40 are formed on a fixed part, which is formed here by a fixed plate, and in particular are formed at the end thereof, i.e. at its end remote from the pad cover 22. As seen from the seat surface 20, the fixed part 48 is arranged below the pad cover 22, which is padded. When the operating part 46 is moved in the longitudinal direction 24, the deflection devices 36, 42 are moved with it. This is in particular such that, starting from a position shown in FIG. 4 with a long seat surface, by pushing the operating part 46 to the right in FIGS. 3 to 5, i.e. in the direction of the backrest, the pad cover is pulled by the flexible part so that it is possible to switch, via the adjustable intermediate position which is likewise shown in FIG. 5, to the position shown in FIG. 4 in which more of the pad cover 22 is arranged below the seat surface. Accordingly, the seat surface in FIG. 3 is reduced in size. In the region of the end 38 and of the adjoining section, the pad cover 22 penetrates into a shaft 50. The pad cover 22 is designed with a tapering thickness in the end region facing towards the end 38, and namely in particular is thinner than in the other regions. It should be noted that the design may be such that the seat depth 30 is continuously adjustable. In one preferred embodiment, it may be provided that the pad cover 22 and/or the first deflection device 32 and/or the second deflection device 42 are spring-loaded, for example spring-loaded in the direction of an enlarged seat surface 20. An arresting device may also be provided for fixing positions of defined size of the seat surface 20.

Figure 6:
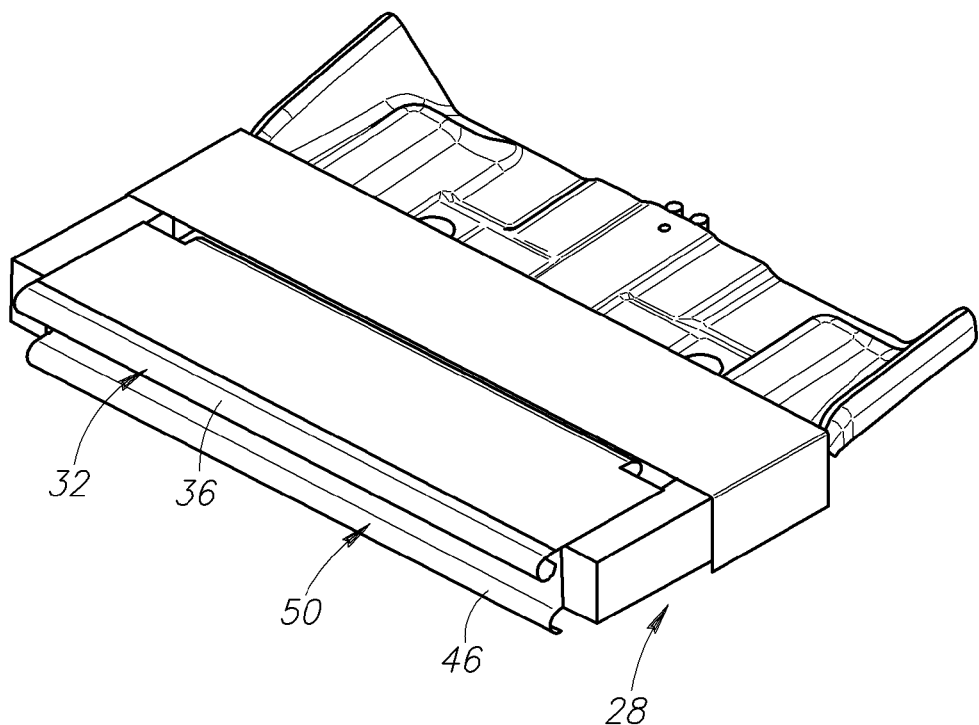
FIGS. 6-7 show an example of a vehicle seat according to the invention, in particular that shown in FIGS. 1 and 2 and 3 to 5, in two different positions.
Figure 7:
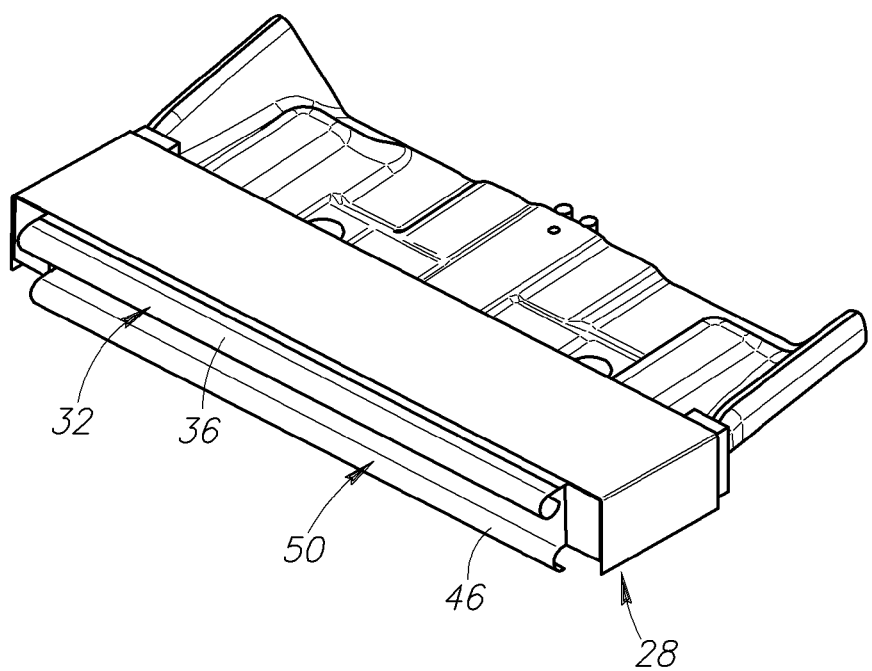

The shaft 50 can also clearly be seen in FIGS. 6 and 7 in the vertical direction between the plate 34 or the curved section 36 or the first deflection device 32 on the one hand, and the operating part 46 on the other hand. In the embodiment shown in FIGS. 6 and 7, the pad cover 22 has been removed. FIG. 6 shows a position of the seat depth adjustment device in which the seat depth 30 is larger or extended, and FIG. 7 shows a position of the seat depth adjustment device 28 in which the seat depth 30 is smaller or shorter.

Figure 8:
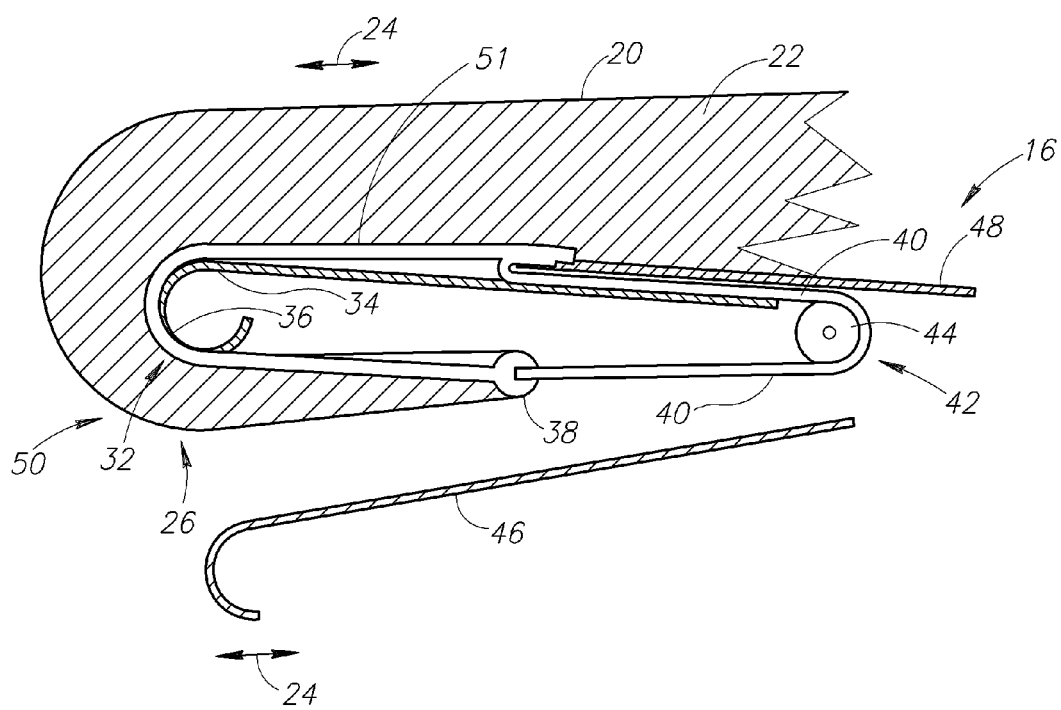
FIG. 8 shows an example of a vehicle seat according to the invention in a selective diagram according to a further embodiment of the invention.

FIG. 8 shows in a selective diagram a seat depth adjustment device according to a further embodiment of the invention for the vehicle seat according to the invention. The seat depth adjustment device differs from the seat depth adjustment device already shown in FIG. 3 and FIG. 4 in that a further strap 51 is connected to the ends of the flexible part in order thus to prevent pronounced creasing of the pad cover on the underside thereof. This is because this strap 51, which may be designed in a general form as a flexible part, may be connected for example to the underside of the pad cover, for example in the form of a seam, in order to prevent any creasing of the pad cover when the pad cover is displaced forward and backward.

The above principle of seat depth adjustment can likewise be used for adjusting the height of the head part, for extending the backrest or on a pull-out side support for a seat pad.

All the features disclosed in the application documents are claimed as essential to the invention in so far as they are novel individually or in combination with respect to the prior art.

| LIST OF REFERENCES | |
| --- | --- |
| 1 | vehicle seat |
| 10 | backrest |
| 12 | armrest |

-continued

LIST OF REFERENCES

| | |
|---|---|
| 14 | armrest |
| 16 | seat surface device |
| 18 | base |
| 20 | seat surface |
| 22 | pad cover |
| 24 | longitudinal direction |
| 26 | front end region of 20 |
| 28 | seat depth adjustment device |
| 30 | seat depth |
| 32 | first deflection device |
| 34 | plate |
| 36 | curved or bent section of 34 |
| 38 | end of 22 at a distance from 10 |
| 40 | flexible part |
| 42 | second deflection device |
| 44 | bolt |
| 46 | operating part |
| 48 | fixed part or fixed plate |
| 50 | shaft |

The embodiments of the invention in which an exclusive property or privilege is claimed are defined as follows:

1. An adjustable depth vehicle seat having a backrest and a seat pad cover that defines a seat surface extending between the backrest and an end region remote from the backrest, comprising a seat depth adjustment device having:
   a first deflection device for deflecting the seat pad cover in the end region of the seat surface;
   a flexible member that is coupled to a first end of the seat pad cover; and
   a second deflection device for deflecting the flexible member, the second deflection device being arranged at a distance from the first deflection device,
   wherein the first deflection device is formed by at least one non-rotating curved or bent plate section,
   wherein the first and second deflection devices are coupled to an operating part,
   wherein the operating part is arranged below the first and second deflection devices, such that movement of the operating part causes motion of the seat pad cover and the flexible member about the respective deflection devices.

2. The vehicle seat according to claim 1, wherein the position of the first deflection device is adjustable relative to the backrest for the purpose of seat depth adjustment.

3. The vehicle seat according to claim 1, wherein the first deflection device is configured for a deflection of the seat pad cover through an angle of more than 100°.

4. The vehicle seat according to claim 1, wherein the position of the second deflection device is adjustable for the purpose of seat depth adjustment.

5. The vehicle seat according to claim 1, wherein the second deflection device is configured for a deflection of the flexible member through an angle of more than 100°.

6. The vehicle seat according to claim 1, wherein the second deflection device comprises at least one bolt.

7. The vehicle seat according to claim 1, wherein the second deflection device is fixedly connected to the first deflection device.

8. The vehicle seat according to claim 1, wherein the thickness of the seat pad cover substantially tapers from the backrest to the end region remote from the backrest.

9. An adjustable depth vehicle seat, comprising:
   a backrest;
   a seat surface device having a seat pad cover that defines a seat surface extending between the backrest and an end region remote from the backrest, wherein a first end of the seat pad cover is attached to the backrest; and
   a seat depth adjustment device having
      a first deflection device for deflecting the seat pad cover in the end region of the seat surface;
      a flexible member that is coupled to a second end of the seat pad cover; and
      a second deflection device for deflecting the flexible member, the second deflection device being arranged at a distance from the first deflection device,
      wherein the first deflection device is formed by at least one a non-rotating curved or bent plate section,
      wherein the first and second deflection devices are coupled to an operating part,
      wherein the operating part is arranged below the first and second deflection devices, such that movement of the operating part causes motion of the seat pad cover and the flexible member about the respective deflection devices.

10. The vehicle seat according to claim 9, wherein the position of the first deflection device is adjustable relative to the backrest for the purpose of seat depth adjustment.

11. The vehicle seat according to claim 9, wherein the first deflection device is configured for a deflection of the seat pad cover through an angle of more than 100.

12. The vehicle seat according to claim 9, wherein the position of the second deflection device is adjustable for the purpose of seat depth adjustment.

13. The vehicle seat according to claim 9, wherein the second deflection device is configured for a deflection of the flexible member through an angle of more than 100.

14. The vehicle seat according to claim 9, wherein the second deflection device comprises at least one bolt.

15. The vehicle seat according to claim 9, wherein the second deflection device is fixedly connected to the first deflection device.

16. The vehicle seat according to claim 9, wherein the thickness of the seat pad cover substantially tapers from the backrest to the end region remote from the backrest.

* * * * *